United States Patent
Corwith

(10) Patent No.: US 6,697,630 B1
(45) Date of Patent: Feb. 24, 2004

(54) AUTOMATIC LOCATION IDENTIFICATION SYSTEM COMPARING STORED FIELD STRENGTH DATA AND AN ACTUAL CELLULAR CALL'S FIELD STRENGTH

(75) Inventor: John Thomas Corwith, West Chicago, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/527,268

(22) Filed: Mar. 17, 2000

(51) Int. Cl.[7] .................................................. H04Q 7/20
(52) U.S. Cl. ................. 455/457; 455/456.3; 455/562.1; 455/404.2; 342/394; 342/465; 340/539.13
(58) Field of Search ........................ 455/404.2, 562.1, 455/456.3, 457; 340/539; 342/394, 465

(56) References Cited

U.S. PATENT DOCUMENTS

| | | | | |
|---|---|---|---|---|
| 3,967,277 A | * | 6/1976 | Hastings et al. | 342/394 |
| 6,138,026 A | * | 10/2000 | Irvin | 342/357.1 |
| 6,161,024 A | * | 12/2000 | Komara | 455/101 |
| 6,167,274 A | * | 12/2000 | Smith | 455/456.3 |
| 6,239,700 B1 | * | 5/2001 | Hoffman et al. | 340/539 |
| 6,256,489 B1 | * | 7/2001 | Lichter et al. | 455/404 |
| 6,421,009 B2 | * | 7/2002 | Suprunov | 342/457 |

* cited by examiner

*Primary Examiner*—Sinh Tran
*Assistant Examiner*—Nguyen David

(57) ABSTRACT

An Automatic Location Identification (ALI) system for cellular telephone networks, along with a pseudo Automatic Number Identification (ANI) typically representing a particular face of a cell tower receiving an emergency call, compares the electromagnetic footprint of the call to stored field strength data to ascertain the coordinates of a small polygon subsuming the location of the caller. Along with connecting the emergency call to the emergency (i.e., "911") dispatch center, the system also transmits the caller's Directory Number (DN), the cell tower location, and the coordinates of the location polygon. This approach gives the emergency dispatch center a more definite location than prior art approaches which only provide a large triangular area based on a cell tower face as the location region of the caller. It can also serve as a back-up to more sophisticated resource-intensive approaches using signal time differentials and the like. In an alternate embodiment, the size of the location polygon is further reduced when the caller is located in a region with overlapping cell tower coverage. In this case, the coordinates of the location polygon are the subset of coordinates defining each theoretical coverage area for the overlapping towers.

12 Claims, 4 Drawing Sheets

AUTOMATIC LOCATION IDENTIFICATION SYSTEM COMPARING STORED FIELD STRENGTH DATA AND AN ACTUAL CELLULAR CALL'S FIELD STRENGTH

BACKGROUND OF THE INVENTION

1. Field of the Invention

The present invention generally relates to automatic location identification (ALI) systems for locating cellular telephones—and hence cellular telephone customers—while the customer is placing a telephone call to an emergency dispatch center (i.e., a "911" call), so that rescue vehicles can rapidly and accurately locate the caller.

2. Background

Cellular telephone systems are well known in the art, and minimally include an array of cell towers, each tower facilitating duplex communication of cellular telephone customers within a defined region called a "cell." The switching and processing (including signaling and control) of calls within a cellular telephone system and between a Central Office (CO) of a Public Switched Telephone Network (PSTN), is handled by a Mobile Traffic Switching Office (MTSO).

When typical land-based telephone customers place emergency calls (i.e., dial "911" and the like) to emergency dispatch centers, the Calling Line Identification (CLI) of the telephone line indicates with a high degree of accuracy, the location of the caller. This enables the efficient and accurate dispatching of public safety personnel and vehicles (e.g., ambulance, fire, police, etc.) to assist those in need of emergency services, regardless of whether the caller knows his/her exact location.

The task of automatically locating a cellular telephone customer is made more difficult by the transient nature of calling customers, and the lack of physical telephone lines (that a CLI would identify). Additionally, cellular telephone customers are often unable to clearly identify and describe their physical location during calls to emergency dispatch centers.

Older prior art methods for locating a cellular telephone customer identify the face of a cell tower in communication with the customer by the tower broadcasting to the MTSO, a Pseudo Automatic Number Identification (ANI). A face is principally responsible for communicating in a cone-shaped region within the boundaries of the cell. The angle (in degrees) of the cone can be given by $$360 \div n$$

where n is the number of tower faces of the particular cell tower. For example, if there are 6 tower faces, the cellular customer is assumed to be within a 60° isosceles triangular region starting at the cell tower and ending at the cell "boundary." When the cell covers a large area, the height of the triangular region defined by a tower face can be so large as to make locating the customer impractical.

Newer, more sophisticated approaches are being developed which include measuring the propagation time of signals, and converting those times to distances from the cell tower face. These approaches, however, are hardware-and software-intensive, and may be rendered ineffective by environmental factors.

There is an important need to provide an ALI system which gives a more specific location of cellular telephone callers than a vast, cone-shaped region, and which is simpler and less expensive than resource-intensive approaches. Alternative to replacing complex, resource-intensive approaches currently under development, there is a need for a simple, reliable backup system.

SUMMARY OF THE INVENTION

In view of the aforementioned shortcomings of the prior art, the Automatic Location Identification system of the present invention compares the electronic footprint of an emergency wireless telephone call with field strength data stored for the face of the cell tower in communication with the caller to ascertain the coordinates of a limited size location polygon.

More particularly, the present invention provides, in a wireless telephone network, an Automatic Location Identification (ALI) method at least including the following steps: Via a cell tower, connecting a telephone call from a wireless telephone customer to a wireless service provider, and transmitting from the cell tower to the wireless service provider, a Pseudo Automatic Number Identification (ANI) representing cell tower indicia; and, via the wireless service provider, identifying a Directory Number (DN) for the caller, and comparing the signal footprint, including field strength aspects, of the customer's call to stored field strength characteristics associated with the Pseudo ANI.

The method also at least includes the steps of, based upon the outcome of the comparing step, ascertaining the coordinates of a location polygon subsuming the location of the wireless telephone customer, connecting the wireless telephone customer to an emergency dispatch center designated for handling calls emanating from a region subsuming the location polygon when the customer has designated the call as an emergency call, and transmitting to the emergency dispatch center, the DN, and the coordinates of the location polygon.

The present invention also provides, in a wireless telephone network, an ALI system at least including a wireless service provider adapted to handle general switching and call processing of wireless telephone calls, and adapted to identify a DN for the caller, and a plurality of cell towers adapted to connect a telephone call from a wireless telephone customer to the wireless service provider, the cell towers being adapted to transmit a Pseudo ANI representing cell tower indicia.

The wireless service provider further includes a control unit, a comparator, a transmitter, a receiver, and a field strength database storing field strength information related to a plurality of Pseudo ANIs. The comparator is adapted to, under the control of the control unit, compare the signal footprint, including field strength aspects, of the customer's call to stored field strength characteristics associated with the Pseudo ANI. The control unit is adapted to, based upon the output of the comparator, ascertain the coordinates of a location polygon subsuming the location of the wireless telephone customer.

The wireless service provider is adapted to connect the wireless telephone customer to an emergency dispatch center designated for handling calls emanating from a region subsuming the location polygon. The ALI system transmits to the emergency dispatch center, the DN, and the coordinates of the location polygon.

BRIEF DESCRIPTION OF THE DRAWING FIGURES

Features and advantages of the present invention will become apparent to those skilled in the art from the description below, with reference to the following drawing figures, in which.

Figure 3:
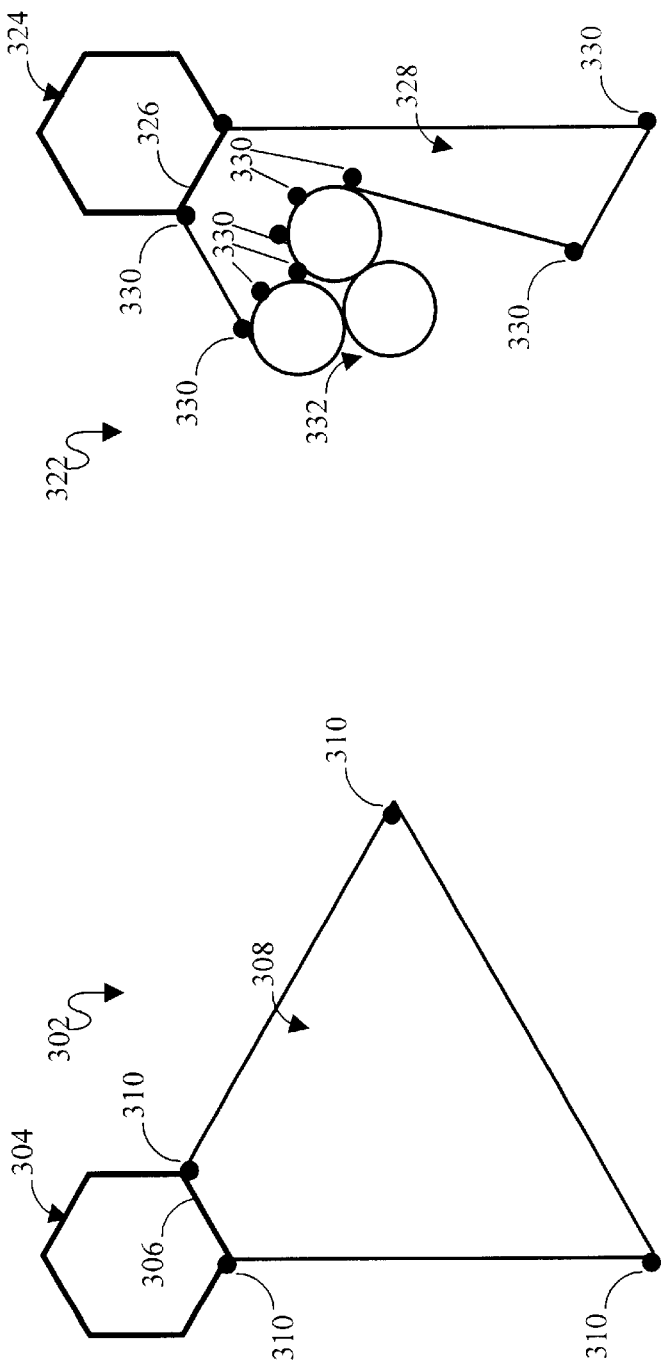
Figure 4:
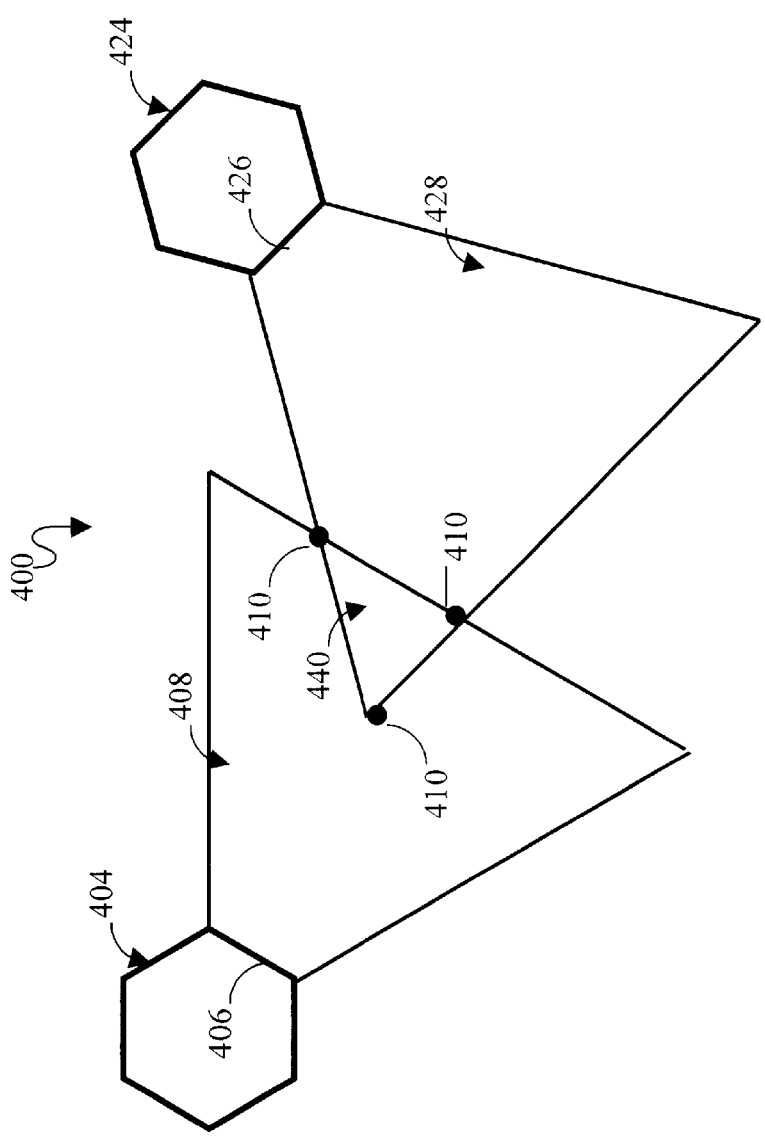

FIG. 3 contains an illustration of one theoretical cellular tower face coverage area example, and another cellular tower face coverage area example where obstructions are present; and FIG. 4 contains an illustration of a refined location polygon subsuming a caller's location when the caller is in an area with overlapping cell tower coverage.

DESCRIPTION OF THE PREFERRED EMBODIMENTS

1. Basic ALI System

Figure 1:
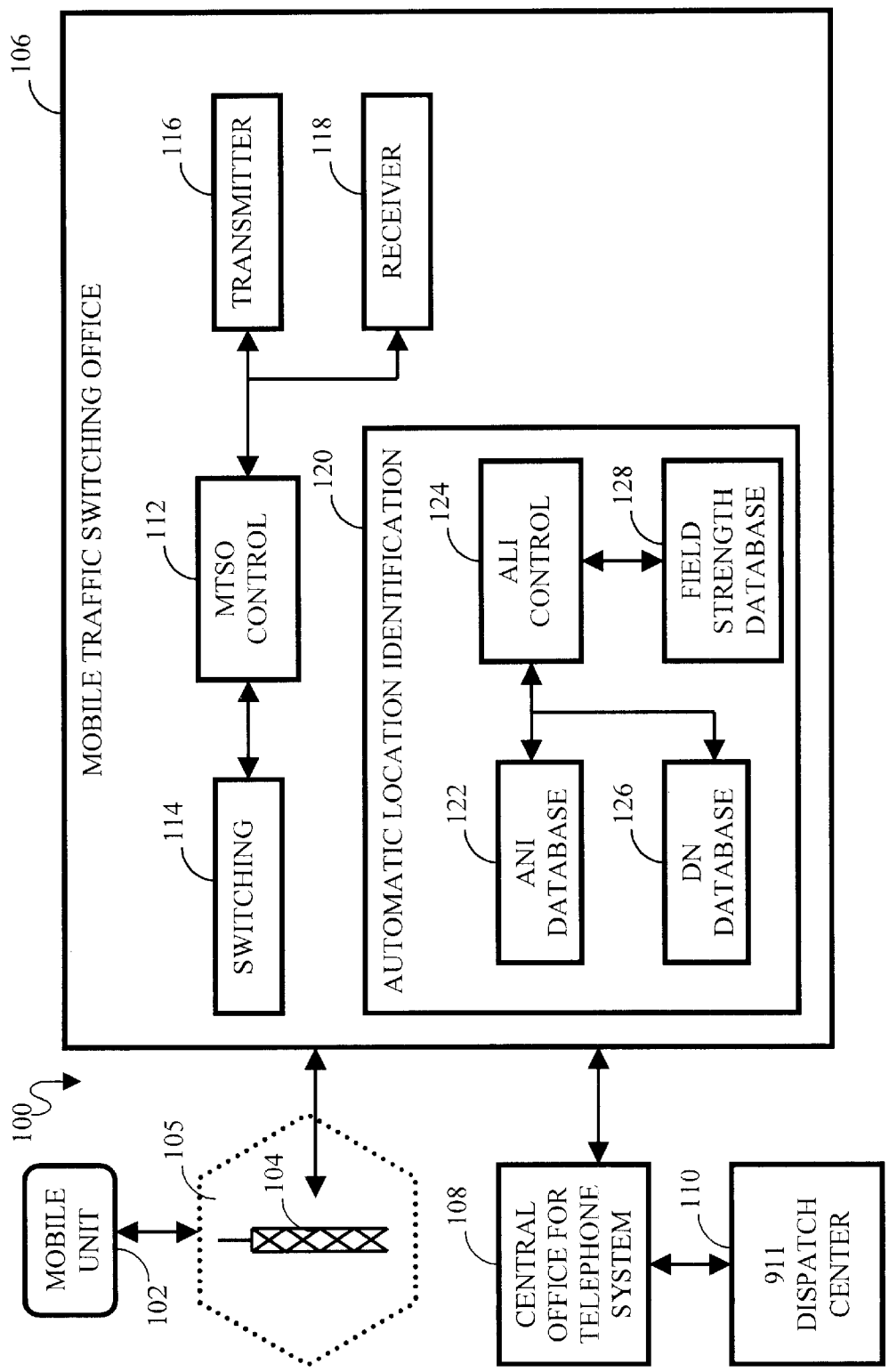
FIG. 1 is a schematic block diagram of the present-inventive automatic location identification system.
Figure 2:
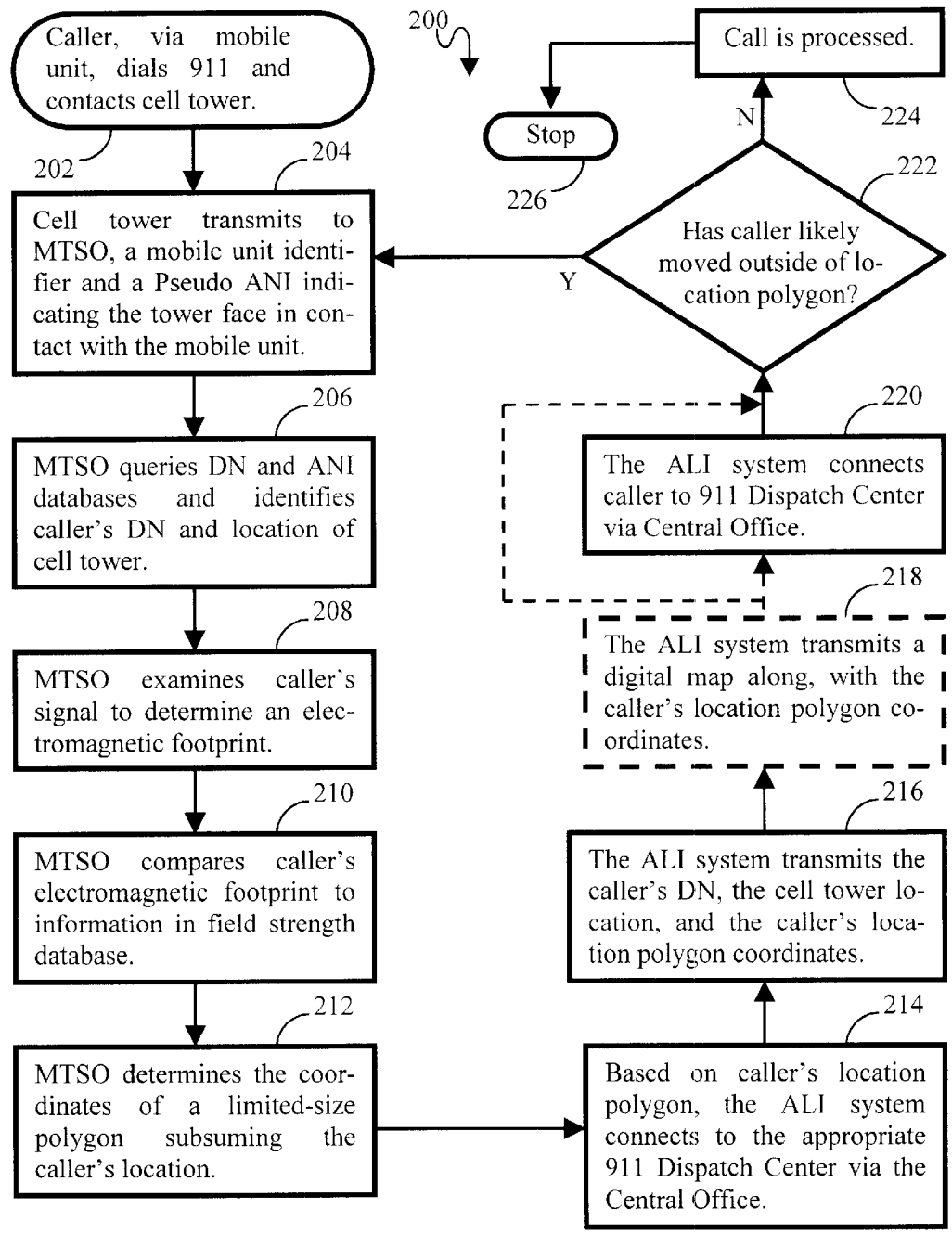
FIG. 2 is a flowchart/algorithm detailing the operation of the present-inventive automatic location identification system and method.

The schematic block diagram in FIG. 1 shows the basic components of the present-inventive Automatic Location Identification (ALI) system 100.

The ALI system 100 of the present is part of a fully-functioning cellular telephone system. Several mobile units such as the one 102 can engage in duplex communication with cell towers such as the one 104. In the example shown, the tower principally covers a cell area 105. The cell tower 104 is also in communication with, and under the control of a Mobile Traffic Switching Office (MTSO) 106.

Communication with the rest of a Public Switched Telephone Network (PSTN) is via a Central Office 108. During an emergency, a cellular telephone customer can be connected to an appropriate 911 Dispatch Center (or "emergency dispatch center").

The MTSO 106 nominally includes an MTSO Control Unit 112, telephone switching circuitry (or switching unit) 114, a transmitter 116, a receiver, 118, and an ALI Unit 120. The Control Unit 112 controls the overall operation of the MTSO, while the switching unit handles the telephone switching functions of the MTSO under the direction of the control unit. The transmitter and receiver function to communicate with other components of the cellular telephone system, and with the PSTN in general.

The ALI unit 120 of the present invention nominally includes an ALI control unit 124 for general control of the ALI unit, an ANI database 122, a DN database, and a field strength database 128. The DN database 122 contains a lookup table matching a code transmitted by each cellular telephone at the beginning of a call with a Directory Number (i.e., the telephone number assigned to the cellular telephone). The ANI database correlates a Pseudo ANI received by the MTSO with the location of the broadcasting cell tower.

Cellular telephone companies currently perform extensive field testing of cellular broadcasts to determine the transmission/reception quality of cellular broadcasts, and to locate "dead spots" and other potential problems caused by terrestrial, man-made, and other environmental phenomena. This field testing involves measuring and storing the extensive pattern of field strength variations in each cell.

The present invention compares (via the ALI control 124) the electromagnetic footprint of a cellular telephone call received at a particular cell tower with field strength data stored in the field strength database 128. From the field strength comparison, supra., the ALI control unit determines a polygonal area from which the cellular telephone call is emanating, and stores the X-Y coordinates.

Along with transferring an emergency call to a 911 Dispatch Center, the system 100 also transmits the coordinates of the location polygon stored by the ALI unit 120, as well as the Pseudo ANI and the DN. The location polygon of the present invention need not be limited to any particular shape or number of sides.

The emergency dispatch center can use the location polygon coordinates to plot the location of the caller on a map of the caller's vicinity. Alternate embodiments of the present invention included transmitting a complete digital map with the location polygon coordinates when the emergency dispatch center is compatible, or sending a bit-mapped image.

FIG. 3 presents examples of the coverage areas of cell tower (304 and 324) faces. Example 302 shows the maximum theoretical coverage area (308) of a cell tower face (306), where no obstructions are present in the coverage area. The coordinate points 310 define the shape and location of the polygon defining the coverage area subsuming a cellular telephone customer's calling location. The example 322 shows the coverage area of a similar cell tower face (326) where major obstructions (332) are present in the field. In this case, the location polygon 328 would have the irregular shape defined by the coordinate points 330.

In an alternate embodiment illustrated by the arrangement 400 in FIG. 4, the location polygon 440 can be further reduced in size when an emergency cellular telephone customer communicates with the faces (e.g., 406 and 426) of more than one cell tower (e.g., 404 and 424). The location polygon 440, defined by the coordinate points 410, outlines the region intersecting the theoretical coverage areas (e.g., 408 and 428) of the cell tower faces in communication with the customer.

2. ALI System Flowchart for Calling Customer Location

FIG. 3 graphically depicts the algorithm 200 used by the present-inventive automatic location identification method when a cellular telephone customer attempts to dial an emergency dispatch center.

To start the location process, a cellular telephone customer dials an emergency telephone number (i.e., "911") and contacts a cell tower (Step 202). The contacted cell tower transmits to the MTSO, the mobile unit identifier, along with the Pseudo ANI indicating the cell tower face in active communication with the customer (Step 204). The MTSO then examines its databases to determine the customer's DN, and the location of the cell tower (Step 206).

The MTSO analyzes the signal received from the customer for its electromagnetic footprint, and compares the footprint with the known field strength data for the tower face in question (Steps 208 and 210). Following the analysis and comparison steps, the MTSO defines a location polygon, and stores the corresponding coordinates (Step 212). In the preferred embodiment, Cartesian coordinates are used. However, other coordinate systems such as Polar Coordinates, can be used, for example.

In the preferred embodiment, the method 200 next executes Step 214, where the ALI system connects (via the Center Office) the 911 dispatch center assigned to handle emergency calls originating from the defined location. Then, the ALI system transmits the DN, cell tower location, and location polygon coordinates to the 911 dispatch center (Step 216).

In an alternate embodiment, the method 200 executes Step 218, to transmit a digital map along with the caller's location polygon. The ALI system connects the caller to the 911 dispatch center in Step 220.

In Step 222, the MTSO again compares the caller's electromagnetic footprint to the stored field strength data to determine if the caller has moved outside of the previously defined location polygon. If a substantial position change is indicated in Step 222, the algorithm again performs Steps 204 through 218.

When no new substantial position changes are indicated, the system processes and then disconnects the emergency call in Step 224.

Those skilled in the art will appreciate that Step 220 can be executed much earlier in the algorithm—such as prior to Step 208—without disturbing the essential function of the present invention.

Variations and modifications of the present invention are possible, given the above description. However, all variations and modifications which are obvious to those skilled in the art to which the present invention pertains are considered to be within the scope of the protection granted by this Letters Patent.

While many functions have been described above as being performed by the MTSO, it will be appreciated by those skilled in the art upon reading the above description, that other portions of a wireless system can perform those functions.

What is claimed is:

1. A method for automatically locating mobile units in a cellular telecommunications network, comprising:
    connecting a telephone call from a cellular customer to a cellular service, said customer being in communication with a plurality of cell towers, each of said cell towers having a plurality of identifiable cell tower faces for handling signals to and from a wireless telephone;
    transmitting from said cell towers to said cellular service provider a Pseudo Automatic Number Identification for each of the cell towers, each of said Pseudo Automatic Number Identifications corresponding to the cell tower face in communication with said customer;
    identifying a Directory Number for said customer and the location of said cell towers in said network;
    comparing the electromagnetic signal footprint, including field strength aspects, of said customer's call to stored field strength characteristics associated with each of said Pseudo Automatic Number Identifications;
    ascertaining the coordinates of a location polygon for each of said cell towers in communication with said customer, each of said location polygons subsuming the location of said customer;
    determining a reduced location polygon, said reduced location polygon being a subset of coordinates defining an overlapping region between said location polygons;
    connecting said wireless telephone customer to an emergency dispatch center designated for handling calls emanating from a region subsuming said reduced location polygon when said customer has designated the call as an emergency call; and
    transmitting to said emergency dispatch center said Director Number and the coordinates of said reduced location polygon.

2. The method defined in claim 1 further comprising the step of transmitting to said emergency dispatch center, a digital representation of a map region including said reduced location polygon thereon.

3. The method defined in claim 1, wherein said location polygons are triangles.

4. The method defined in claim 1, wherein said location polygons are quadrilaterals.

5. The method defined in claim 4, further comprising the step of transmitting to said emergency dispatch center, a digital representation of a map region including said reduced location polygon thereon.

6. The method defined in claim 5, wherein said transmitting to said emergency dispatch center step further comprises transmitting said Pseudo Automatic Number Identifications.

7. The method defined in claim 1 further comprising the step of recomparing the electromagnetic signal footprint of said customer's call to said stored field strength characteristics associated with said Pseudo Automatic Number Identifications to determine whether said customer has moved outside of said reduced location polygon.

8. A system for automatically locating mobile units in a cellular telecommunications network, comprising:
    means for connecting a telephone call from a cellular customer to a cellular service, said customer being in communication with a plurality of cell towers, each of said cell towers having a plurality of identifiable cell tower faces for handling signals to and from a wireless telephone;
    means for transmitting from said cell towers to said cellular service provider a Pseudo Automatic Number Identification for each of said cell towers, each of said Pseudo Automatic Number Identifications corresponding to the cell tower face in communication with said customer;
    means for identifying a Directory Number for said customer and the location of said cell towers in said network;
    means for comparing the electromagnetic signal footprint, including field strength aspects, of said customer's call to stored field strength characteristics associated with each of said Pseudo Automatic Number Identifications;
    means for ascertaining the coordinates of a location polygon for each of said cell towers in communication with said customer, each of said location polygons subsuming the location of said customer;
    means for determining a reduced location polygon, said reduced location polygon being a subset of coordinates defining an overlapping region between said location polygons;
    connecting said wireless telephone customer to an emergency dispatch center designated for handling calls emanating from a region subsuming said reduced location polygon when said customer has designated the call as an emergency call; and
    transmitting to said emergency dispatch center said Director Number and the coordinates of said reduced location polygon.

9. The system defined in claim 8, further comprising means for transmitting to said emergency dispatch center, a digital representation of a map region including said reduced location polygon thereon.

10. The system defined in claim 8, wherein said location polygons are triangles.

11. The system defined in claim 8, wherein said location polygons are quadrilaterals.

12. The system defined in claim 8, further comprising means for transmitting to said emergency dispatch center, a digital representation of a map region including said reduced location polygon thereon.

* * * * *